United States Patent

Kasowski

[11] Patent Number: 5,859,099
[45] Date of Patent: Jan. 12, 1999

[54] FLAME RETARDANT RESIN COMPOSITIONS

[75] Inventor: Robert Valentine Kasowski, West Chester, Pa.

[73] Assignee: E. I. du Pont de Nemours and Company, Wilmington, Del.

[21] Appl. No.: 833,569

[22] Filed: Apr. 7, 1997

[51] Int. Cl.$^6$ .............................. C08K 3/10; C08K 3/34; C08K 5/05; C08K 5/34
[52] U.S. Cl. .......................... 524/100; 524/387; 524/406; 524/791
[58] Field of Search .................... 524/100, 387, 524/406, 791

[56] References Cited

U.S. PATENT DOCUMENTS

| | | | |
|---|---|---|---|
| 3,458,470 | 7/1969 | Edgar | 260/37 |
| 3,936,416 | 2/1976 | Brady | 260/42.18 |
| 4,298,518 | 11/1981 | Ohmura et al. | 260/32.6 |
| 4,871,795 | 10/1989 | Pawar | 524/267 |

FOREIGN PATENT DOCUMENTS

| | | | |
|---|---|---|---|
| 2130793 | 6/1971 | Germany | C01B 25/38 |
| 2150484 | 10/1971 | Germany | C08G 41/02 |

*Primary Examiner*—Kriellion S. Morgan

[57] ABSTRACT

This invention relates to flame retardants for synthetic resin compositions. It is a composition comprising:
(A) about 30 to about 70 wt. percent of a synthetic resin which is,
  (1) about 30 to about 70 wt. percent of a first resin which is polypropylene, polycarbonate, polyphenylene oxide or polystyrene, or copolymers of polystyrene and maleic anhydride, and
  (2) about 30 to about 70 wt. percent of a second resin which is polyethylene terephthalate, or nylon 6,6, or blends or mixtures thereof,
wherein the wt. percentages of (A)(1) and (A)(2) total 100% as between (A)(1) and (A)(2),
(B) a flame retardant selected from the group consisting of
  (1) about 20 to about 45 wt. percent of melamine pyrophosphate, or
  (2) about 15 to about 30 wt. percent of melamine pyrophosphate and up to about 10 wt. percent charring catalyst; or
  (3) about 15 to about 30 wt. percent of melamine pyrophosphate, up to about 10 wt. percent charring catalyst, and up to about 10 wt. percent of a char former, or
  (4) about 20 to about 40 wt. percent melamine pyrophosphate and up to about 5 wt. percent zinc borate, and
(C) up to about 40 wt. percent reinforcing agent,
wherein all percents by wt. are based on the total wt. of (A)+(B)+(C) except for the relationship between (A)(1) and (A)(2) which is set forth above.

16 Claims, No Drawings

FLAME RETARDANT RESIN COMPOSITIONS

FIELD OF THE INVENTION

This invention relates to resin compositions which have a combination of good physical properties and good flame retardance (fire resistance).

TECHNICAL BACKGROUND

Synthetic resins, including polypropylene, polycarbonate, polystrene, polyesters and aliphatic polyamides, such as nylon-6,6 and nylon-6, and copolymers and blends thereof, are often used for molded articles and fibers. In many uses, particularly for molded articles, it is preferred that the resin have improved resistance to fire, compared to the resin alone. This is often attained by the addition of various agents which improve the basic fire resistance of the resin, but sometimes these agents degrade or diminish other physical properties of the resin. Since resins are widely used, compositions which have improved fire resistance but yet retain the desirable physical properties of the resin are constantly being sought.

German Patents 2,150,484 and 2,130,793, and A. E. Lipska, Comb. Inst. Arizona State Univ., West. State Sect. Combust. Inst. WSCI, 1973, report that certain tungsten compounds can be used in various ways to improve the fire resistance of polyamides. The combinations of agents described hereinafter are not disclosed in these references.

U.S. Pat. No. 4,298,518 discloses compositions containing polyamides and melamine cyanurate, which are said to have good fire resistance.

U.S. Pat. No. 3,458,470 discloses compositions containing polyamides and a variety of tungsten or molybdenum compounds, including silico- and phosphotungstic acids. These compositions are said to have good resistance to discoloration and be stable to light. U.S. Pat. No. 3,936,416 discloses that polystyrene (PS), polypropylene (PP), and polyethylene (PE) are flame proofed by combination of melamine pyrophosphate (MPP) and dipentaerythritol, but requires about a 45% loading of the total resin plus flame retardant composition.

Melamine phosphate may be added to synthetic resins to improve the flame retardancy of the resins, but when heated to normal engineering polymer processing temperatures the melamine phosphate gives off so much water that the resultant mixture of the resin and the melamine phosphate has very poor physical properties.

What are needed, therefore, are flame retardant resin compositions which do not have the problems and deficiencies of the prior art, and particularly compositions with mechanical properties that are not reduced too much by the addition of flame retardants.

SUMMARY OF THE INVENTION

This invention is certain flame resistant (fire retardant) polymer compositions. The compositions comprise:
(A) about 30 to about 70 wt. percent of a synthetic resin which is,
  (1) about 30 to about 70 wt. percent of a first resin which is polypropylene, polycarbonate, polyphenylene oxide or polystyrene, or copolymers of polystyrene and maleic anhydride, and
  (2) about 30 to about 70 wt. percent of a second resin which is polyethylene terephthalate, or nylon 6,6, or blends or mixtures thereof, wherein the wt. percentages of (A)(1) and (A)(2) total 100% as between (A)(1) and (A)(2),
(B) a flame retardant selected from the group consisting of
  (1) about 20 to about 45 wt. percent of melamine pyrophosphate, or
  (2) about 15 to about 30 wt. percent of melamine pyrophosphate and up to about 10 wt. percent charring catalyst; or
  (3) about 15 to about 30 wt. percent of melamine pyrophosphate, up to about 10 wt. percent charring catalyst, and up to about 10 wt. percent of a char former, or
  (4) about 20 to about 40 wt. percent melamine pyrophosphate and up to about 5 wt. percent zinc borate, and
(C) up to about 40 wt. percent reinforcing agent,
wherein all percents by wt. are based on the total wt. of (A)+(B)+(C) except for the relationship between (A)(1) and (A)(2) which is set forth above.

These compositions exhibit good fire resistance and are useful as molding resins. These compositions may also include other additional fillers and additives as are commonly known in the art.

DETAILED DESCRIPTION OF THE INVENTION

In order for test bars to pass the standard flamability test, UL94, that is, have a rating of VO at a thickness of $\frac{1}{16}$ inch (0.16 cm), U.S. Patent 3,936,416 teaches that the combined loading in polypropylene of MPP and dipentaerythritol needs to be 45% or more. Such high loadings have not been commercially useful because of the resultant high cost. The high loadings of MPP and dipentaerythritol also reduce the mechanical properties (such as elongation) unacceptably. Polystyrene and polyethylene can also be flame proofed by loadings of 45% or more, with unacceptable cost and mechanical performance. Substitution of other polyols besides pentaeiythritols have the same difficulty.

It has been unexpectedly discovered that certain polymer blends and copolymers of a first resin of polypropylene, polystyrene, polyphenylene oxide, and polycarbonate (and copolymers, blends and mixtures thereof) can be flame proofed (passes UL94VO at 0.16 cm thickness) with MPP loadings as little as 30 wt. %, if blended with a second resin, nylon 6,6 (a synthetic condensation product of adipic acid and hexamethylene diamine; cf. Condensed Chemical Dictionary, S. Hawley, edition, $10^{th}$ ed., Van Nostrand Reinhold Co., N.Y., 1981, p. 749), or polyethylene terephthalate (PET) or blends in mixtures thereof, based on total weight of the first and second resin. The cost is then commercially acceptable, and adequate mechanical performance is achievable.

The composition described herein is a resin composition having both good physical properties and good flame retardancy. The composition has three components: (A) synthetic resin blends of (1) polypropylene, polyearbonate, polyphenylene oxide, polystrene, or copolymers of polystyrene and maleic anhydride, with (2) PET or nylon 6,6; (B) a flame retardant which includes MPP and optionally a charring catalyst or a charring catalyst and a char former, and optionally zinc borate; and (C) a glass or mineral reinforcing agent.

The first component (A) is a synthetic resin blend or mixture present in the composition in an amount of about 30 to about 70 wt. percent of the composition (A) plus (B) plus (C).

By "polycarbonates" (A) is meant typical polycarbonates, produced by the reaction of phosgene with bisphenol A and typically have repeat units such as

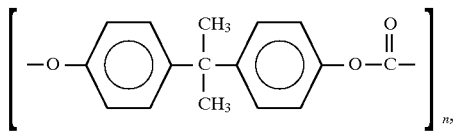

"Polypropylene" (PP) and "Polystyrene" (PS) are polyolefms made from monofunctional alkenes. Polypropylene has propylene as the repeat unit.

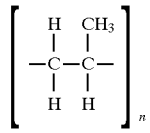

Polystyrene has the repeat unit vinyl styrene

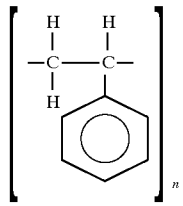

"Polyphenylene oxide" (PPO) has the repeat unit

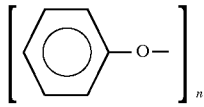

By "copolymers of polystyrene and maleic anhydride" (PSMA) is meant copolymers of styrene with maleic anhydride, wherein typically there is up to 20% maleic anhydride, preferably 5–15% maleic anhydride.

The polyester as used in component (A)(2) is polyethylene terephthalate (PET), and includes polymers having an inherent viscosity of 0.3 or greater and which are linear saturated condensation products of glycol and dicarboxylic acid, or reactive derivatives thereof.

The polyamide in component (A)(2) is nylon 6,6.

Mixtures or blends of PET and nylon 6,6 may also be used.

Component (C) in the invention is optional. It is a reinforcing agent, such as a glass or mineral reinforcing agent, and which may include glass, carbon, mica and/or aramid fibers. The reinforcing agent, which is present in an amount of about up to 40 weight percent, based on total weight of (A), (B) and (C), is important in obtaining the desired combination of both good physical properties and improved fire resistance in the inventive composition.

Component (B) of the invention is a flame retardant that includes $H_4M_2P_2O_7$ (MPP), wherein M means melamine, and optionally either a charring catalyst, or a charring catalyst and a char former. In one embodiment, MPP is doped with a charring catalyst or with a charring catalyst and a char former. In another embodiment zinc borate may be added to MPP.

The flame retardant component typically contains about 20 to about 45 weight percent of the melamine pyrophosphate, based on the total weight of (A) plus (B) plus (C), when optional flame retardant additives, in (B)(2) and (B)(3) are not present. When less than 20 weight percent of MPP is present, the composition is not effective as a flame retardant. However, lower amounts of the flame retardant may be effective under a flame retardant test less stringent that UL94, such as the glow wire test of International Standard IEC 695-2-1/0 1994.

An optional ingredient of the inventive composition that is part of the flame retardant in (B)(2) and (B)(3) is a charring catalyst. The presence of the charring catalyst is not essential to the invention, but its use in conjunction MPP reduces the amount of MPP needed, as discussed below.

As used herein, the term "charring catalyst" includes metal salt of a tungstic acid or a complex oxide acid of tungsten and a metalloid, a tin oxide salt such as sodium tin oxide, and/or anmmonium sulfamate. Preferred metal salts include alkali metal salts of a tungstic acid, with sodium tungstate being especially preferred. By a complex oxide acid of tungsten and a metalloid is meant a complex oxide acid formed by a metalloid such as phosphorous or silicon and tungsten. Preferred complex oxide acids include silicotungstic acid and phosphotungstic acid, with silicotungstic acid being especially preferred. If the charring catalyst is present as part of the flame retardant component of the inventive composition it is present in an amount up to about 10 weight percent based on the total weight of the inventive composition. A preferred range is from about 0.1 to about 10 weight percent, with a more preferred range being from about 0.1 to about 2 weight percent.

Another optional ingredient of the inventive composition that is part of the flame retardant is a char former such as a polyhydric alcohol in (B)(3). Other examples include novolac, vinyl alcohols and starches. In the present invention, it is preferred that the polyhydric alcohol be penterythritol or dipenterythritol. If it is present in the composition, the char former is present in amounts of up to 10 weight percent based on the total weight of the inventive composition. A preferred range is from about 0.1 to about 10 weight percent, with a more preferred range being from about 0.1 to about 2 weight percent.

Still another optional ingredient of the inventive composition that are part of the flame retardant is zinc borate, in (B)(4), in an amount up to 3 weight percent.

By "melamine compound doped with a charring catalyst" is meant MPP that is made such that the charring catalyst is bound to the MPP. The compound doped with a charring catalyst may be made by preparing an aqueous solution of melamine, preparing an aqueous solution of silicotungstic acid or phosphotungstic acid, and preparing an aqueous solution of a phosphorous compound, such as $H_3PO_4$ (85% acid). The tungstic acid solution is added to the phosphorous solution, and then that mixture is added to the melamine solution, wherein melamine phosphate is converted to melamine pyrophosphate through the loss of a water molecule. The resulting solution is vacuum dried to produce the doped melamine phosphate compound. The mole ratio of the melamine to phosphorous in the solution should be from 2:1 to 1:2. The number of moles of the charring catalyst should be from 0.01 to 0.5 moles per mole MPP, and preferably 0.1 moles per mole of MPP. There may not be a 100% conversion of melamine phosphate to melamine pyrophosphate when the doped melamine compound is made, so that while the doped melamine compound is primarily melamine pyrophosphate, it may also include unconverted melamine phosphate.

The melamine compound that is doped with a charring catalyst may also be made by contacting, in an aqueous medium, melamine and silicotungstic acid or iphosphotungstic acid in a molar ratio of from about 1 to about 24 moles of melamine per mole of the tungsten compound to prepare "melamine salts" of the tungstic acids. It is preferred that the contacting be carried out at about 50° C. to about 100° C. It is believed that the melamine not only forms salts with the tungsten compound used, but also solvates the resulting salt much like water forms hydrates. Cyanuric acid may also be present so that the melamine forms a "mixed salt" with cyanuric acid and the silico- or phosphotungstic acid.

Preferred compositions include those wherein component (A)(1) is PP, PS, PPO or PSMA and component (A)(2) is nylon 6,6. Also preferred are compositions wherein component (A)(1) is PC and component (A)(2) is PET.

The compositions described herein have improved fire resistance compared to the resin alone, and are particularly useful as molding resins for making parts such as electrical and electronic parts such as bobbins, coil forms, connectors, fasteners, and for parts in equipment such as circuit breakers. These compositions also retain the good physical properties of the resins, that is desirable mechanical properties particularly toughness. Toughness may be roughly estimated as being proportional to the product of the tensile strength and elongation, so the higher either or both of these are, the tougher the polymer. It is preferred that the composition be fire resistant enough so that it has a rating of V0 in the Underwriters Laboratory test UL-94, at a thickness of 0.16 cm (1/16 inch).

It is also preferred that the MPP, reinforcing agent and flame retardant, such as the charring catalyst, be relatively well dispersed in the resin. A preferred degree of dispersion can be attained by producing the composition in any of a number of different types of equipment which are commonly used to disperse materials in polymers. For instance, a twin screw extruder with appropriate mixing screw sections can be used to satisfactorily melt mix the ingredients. It is also believed that the dispersion of the charring catalyst in the polymer is aided by starting with tungsten compound having relatively small particle sizes.

In a preferred embodiment, a flow enhancer may be added to the composition to improve the flow. An example of an acceptable flow enhancer is dodecanedioic acid (DDDA), available from E. I. du Pont de Nemours and Company of Wilmington, Del. When a flow enhancer is used with the compositions of the invention, it is preferred that the flow enhancer be used in an amount of from about 0.25 to about 0.5 weight percent, based only on the total weight percent of the resin, reinforcing agent, and flame retardant.

EXAMPLES

The following abbreviations are used in the Examples and the Tables set out below:
MPP—melamine pyrophosphate
PP—polypropylene
PC—polycarbonate
PPO—polyphenylene oxide
PS—polystyrene
N66—nylon 6,6
PET—polyethylene terephthalate
EPON—epoxy
LOX—organic substituted pentaerythritol
EBS—Acrawax C
DDDA—Dodecanedioic acid Unless otherwise indicated, the following procedure was used in the examples. The resin used in the Examples was in the form of pellets. The resin, a reinforcing material, and MPP were thoroughly mixed, which usually took about 30 minutes.

The resin mixture was then dried and then extruded on either a 28 mm or a 30 mm Werner & Pfleiderer twin screw extruder, using a screw design having a mid range screw severity, at a melt temperature of 200°–300° C., and at rates of 11.3–15.9 kg per hour. Bars of 1/16 inch (0.16 cm) thick were molded on a 0.043 kg (1.5 oz) molding machine.

Melt temperatures were typically about 200°–300° C., and mold temperatures were typically 45°–120° C. The molded bars were then tested for a flammability rating in the UL-94 test at 0.16 cm thickness, unless otherwise indicated.

Examples 1–10

Nylon 6,6 blended with other polymers.

These examples contain MPP purchased from Cytek Industries (Newark, N.J.). Nylon 6,6 was Zytel 101 from DuPont.

Examples 1–2

(Table 1)

PPO (IV=0.4) was obtained from GE (Schenectady, N.Y.). Example 1 contains glass from PPG Industries (Pittsburgh, Pa.) (PPG3540) as reinforcing material. Example 2 did not contain glass. Both compositions were rated UL94VO.

TABLE 1

| (wt %) | | | | | |
|---|---|---|---|---|---|
| N66 | PPO | EBS | DDDA | MPP | GLASS |
| 23.25 | 23.25 | 0.25 | 0.25 | 28 | 25 |
| 34.7 | 34.7 | 0.3 | 0.3 | 30 | NONE |

Example 3–4

(Table 2)

PP was obtained from Lyondell Petrochemical Co., Houston, Tex. (PP3154a). Example 3 contains glass (PPG3540), and Example 4 did not contain glass. Both compositions were rated UL94VO.

TABLE 2

| (wt %) | | | | | |
|---|---|---|---|---|---|
| N66 | PP | EBS | DDDA | MPP | GLASS |
| 23.25 | 23.25 | 0.25 | 0.25 | 28 | 25 |
| 34.7 | 34.7 | 0.3 | 0.3 | 30 | NONE |

Example 5–6

(Table 3)

PC was obtained from GE (Lexan 101). Example 5 contains glass (PPG3540) and Example 6 did not contain glass. Both compositions were rated UL94VO.

TABLE 3

| (wt %) | | | | | |
|---|---|---|---|---|---|
| N66 | PC | EBS | DDDA | MPP | GLASS |
| 23.25 | 23.25 | 0.25 | 0.25 | 28 | 25 |
| 34.7 | 34.7 | 0.3 | 0.3 | 30 | NONE |

Examples 7–8

(Table 4)

A type of PS, SMA (polystyrene-maleic anhydride copolymer) was obtained from Nova (Pittsburgh, Pa.).

Example 7 contains glass (PPG3540) and Example 8 did not contain glass. Both compositions were rated UL94VO.

TABLE 4

| (wt %) | | | | | |
|---|---|---|---|---|---|
| N66 | SMA | EBS | DDDA | MPP | GLASS |
| 23.25 | 23.25 | 0.25 | 0.25 | 28 | 25 |
| 34.7 | 34.7 | 0.3 | 0.3 | 30 | NONE |

Examples 9–10

(Table 5)

HIPS (high impact PS or Styron F220 from Dow Chemical, Midland, Mich.) was used. Example 9 contains glass (PPG3540) and Example 10 did not contain glass. Both compositions were rated UL94VO.

TABLE 5

| (wt %) | | | | | |
|---|---|---|---|---|---|
| N66 | PS | EBS | DDDA | MPP | GLASS |
| 23.25 | 23.25 | 0.25 | 0.25 | 28 | 25 |
| 34.7 | 34.7 | 0.3 | 0.3 | 30 | NONE |

Example 11

PET blended with PC (Table 6)

PC was obtained from GE, (Lexan 101). PET was Rynite 3934 from DuPont. Example 11 contains glass (PPG3563). The composition was rated UL94VO. LOX was LOXIAL 7119 obtained from Hankel Co., LaGrange, Ill. EPON was 1009F from Shell Chemical, Houston, Tex.

TABLE 6

| (wt %) | | | | | |
|---|---|---|---|---|---|
| PET | PC | EPON | LOX | MPP | GLASS |
| 23.25 | 23.25 | 0.25 | 0.25 | 28 | 25 |

Although particular embodiments of the present invention have been described in the foregoing description, it will be understood by those skilled in the art that the invention is capable of numerous modifications, substitutions and rearrangements without departing from the spirit or essential attributes of the invention. Reference should be made to the appended claims, rather than to the foregoing specification, as indicating the scope of the invention.

In addition to the components discussed above, the compositions of this invention may contain additives commonly employed with synthetic resins, such as colorants, mold release agents, antioxidants, tougheners, nucleating agents, ultraviolet light and heat stabilizers and the like. An example of a common filler is magnesium hydroxide.

What is claimed is:

1. A composition comprising:
    (A) about 30 to about 70 wt. percent of a synthetic resin which is,
        (1) about 30 to about 70 wt. percent of a first resin which is polypropylene, polycarbonate, polyphenylene oxide or polystyrene, or copolymers of polystyrene and maleic anhydride, and
        (2) about 30 to about 70 wt. percent of a second resin which is polyethylene terephthalate, or nylon 6,6, or blends or mixtures thereof,
    wherein the wt. percentages of(A)(1) and (A)(2) total 100% as between (A)(1) and (A)(2),
    (B) a flame retardant selected from the group consisting of
        (1) about 20 to about 45 wt. percent of melamine pyrophosphate, or
        (2) about 15 to about 30 wt. percent of melamine pyrophosphate and up to about 10 wt. percent charring catalyst; or
        (3) about 15 to about 30 wt. percent of melamine pyrophosphate, up to about 10 wt. percent charring catalyst, and up to about 10 wt. percent of a char former which is novolac vinyl alcohol or starch, or
        (4) about 20 to about 40 wt. percent melamine pyrophosphate and up to about 5 wt. percent zinc borate, and
    (C) up to about 40 wt. percent reinforcing agent,
    wherein all percents by wt. are based on the total wt. of (A)+(B)+(C) except for the relationship between (A)(1) and (A)(2) which is set forth above.

2. The composition of claim 1 wherein the charring catalyst is phosphotungstic acid or silicotungstic acid.

3. The composition of claim 1 wherein the charring catalyst is an alkali metal salt of tungstic acid.

4. The composition of claim 1 wherein the amount of the charring catalyst is about 0.1 to about 10 wt. percent.

5. The composition of claim 4 wherein the amount of the charring catalyst is about 0. 1 to about 2 wt. percent.

6. The composition of claim 1 wherein the amount of the char former is about 0.1 to about 10 wt. percent.

7. The composition of claim 6 wherein the amount of the char former is about 0.1 to about 2 wt. percent.

8. The composition of claim 1 wherein (B) is melamine pyrophosphate.

9. The composition of claim 8 wherein (B) is about 30 wt. percent.

10. The composition of claim 1 wherein the relative wt. percentages (A)(1) and (A)(2) are each about 50%, based solely on the wt. of (A)(1) and (2).

11. The composition of claim 1 wherein (A)(1) is polypropylene, polystyrene, polypropylene oxide, or copolymers of polystyrene and maleic anhydride, and (A)(2) is nylon 6,6.

12. The composition of claim 1 wherein (A)(1) is polycarbonate and (A)(2) is polyethylene terephthlate.

13. The composition of claim 11 wherein (B) is melamine pyrophosphate.

14. The composition of claim 12 wherein (B) is melamine pyrophosphate.

15. The composition of claim 1 wherein (C) is glass, carbon, mica, aramid fibers or mixtures thereof.

16. A molded article made from the composition of any of claims 1 to 15.

* * * * *